(12) United States Patent
Bhushan et al.

(10) Patent No.: US 8,498,192 B2
(45) Date of Patent: Jul. 30, 2013

(54) SPATIAL PILOT STRUCTURE FOR MULTI-ANTENNA WIRELESS COMMUNICATION

(75) Inventors: Naga Bhushan, San Diego, CA (US);
Tamer Kadous, San Diego, CA (US);
Mingxi Fan, San Diego, CA (US);
Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1068 days.

(21) Appl. No.: 11/677,000

(22) Filed: Feb. 20, 2007

(65) Prior Publication Data

US 2007/0195688 A1    Aug. 23, 2007

Related U.S. Application Data

(60) Provisional application No. 60/775,443, filed on Feb. 21, 2006, provisional application No. 60/775,693, filed on Feb. 21, 2006.

(51) Int. Cl.
*H04J 11/00* (2006.01)

(52) U.S. Cl.
USPC .......................................... 370/203; 370/334

(58) Field of Classification Search
USPC .................................. 370/203, 334
See application file for complete search history.

(56) References Cited

U.S. PATENT DOCUMENTS

| | | | |
|---|---|---|---|
| 6,078,572 A | 6/2000 | Tanno et al. |
| 6,130,886 A | 10/2000 | Ketseoglou et al. |
| 6,694,469 B1 | 2/2004 | Jalali et al. |
| 6,717,924 B2 | 4/2004 | Ho et al. |
| 6,788,687 B2 | 9/2004 | Bao et al. |
| 6,822,952 B2 | 11/2004 | Abrol et al. |
| 6,882,632 B1 | 4/2005 | Koo et al. |
| 6,912,214 B2 | 6/2005 | Madour et al. |
| 6,963,534 B1 | 11/2005 | Shorey et al. |
| 6,970,437 B2 | 11/2005 | Lott et al. |
| 6,980,569 B1 | 12/2005 | Beyda et al. |

(Continued)

FOREIGN PATENT DOCUMENTS

| | | |
|---|---|---|
| EP | 0959634 A2 | 11/1999 |
| EP | 0995275 | 4/2000 |

(Continued)

OTHER PUBLICATIONS

Fan, et al.; "On the Reverse Link Performance of Cdma2000 1Xev-Do Revision A System", IEEE Xplore Online, Feb. 2005, pp. 2244-2250,XP002438335,New York, USA.

(Continued)

*Primary Examiner* — Mark Rinehart
*Assistant Examiner* — Christopher R Crompton
(74) *Attorney, Agent, or Firm* — Kevin T. Cheatham

(57) ABSTRACT

Spatial pilot to support MIMO receivers in a multi-antenna and multi-layer transmission communication system. A first layer pilot for a single layer transmission is repeated across subbands in a first OFDM symbol and the first layer pilot is also repeated offset from the first OFDM symbol in an adjacent second OFDM symbol. Additional transmission layers may also be transmitted each include a separate pilot generated and repeated in the first symbol and repeated offset form the separate pilot in an adjacent second symbol. The first and second OFDM symbols are then transmitted and received to characterize the receive channels.

36 Claims, 9 Drawing Sheets

U.S. PATENT DOCUMENTS

| | | | |
|---|---|---|---|
| 6,987,780 B2 | 1/2006 | Wei et al. |
| 7,002,900 B2 | 2/2006 | Walton et al. |
| 7,042,869 B1 | 5/2006 | Bender |
| 7,043,249 B2 | 5/2006 | Sayeedi |
| 7,050,405 B2 | 5/2006 | Attar et al. |
| 7,062,283 B2 | 6/2006 | Dooley |
| 7,065,060 B2 | 6/2006 | Yun et al. |
| 7,088,701 B1 | 8/2006 | Attar et al. |
| 7,095,709 B2 | 8/2006 | Walton et al. |
| 7,099,629 B1 | 8/2006 | Bender |
| 7,127,654 B2 | 10/2006 | Jalali et al. |
| 7,139,274 B2 | 11/2006 | Attar et al. |
| 7,145,940 B2 | 12/2006 | Gore et al. |
| 7,170,876 B2 | 1/2007 | Wei et al. |
| 7,463,867 B2 | 12/2008 | Luo et al. |
| 7,680,211 B1 | 3/2010 | Von der Embse |
| 7,719,991 B2 | 5/2010 | Bhushan et al. |
| 7,764,981 B2 | 7/2010 | Kalofonos et al. |
| 8,077,595 B2 | 12/2011 | Bhushan et al. |
| 2001/0009555 A1 | 7/2001 | Diepstraten et al. |
| 2002/0002704 A1 | 1/2002 | Davis et al. |
| 2002/0145990 A1 | 10/2002 | Sayeedi |
| 2002/0193112 A1 | 12/2002 | Aoki et al. |
| 2003/0040315 A1 | 2/2003 | Khaleghi et al. |
| 2003/0072254 A1 | 4/2003 | Ma et al. |
| 2003/0153327 A1 | 8/2003 | Tajiri et al. |
| 2003/0220103 A1 | 11/2003 | Kim et al. |
| 2004/0022203 A1 | 2/2004 | Michelson et al. |
| 2004/0063431 A1 | 4/2004 | Julka et al. |
| 2004/0095851 A1 | 5/2004 | Ellner et al. |
| 2004/0141481 A1 | 7/2004 | Lee et al. |
| 2004/0147223 A1 | 7/2004 | Cho |
| 2004/0228267 A1 | 11/2004 | Agrawal et al. |
| 2005/0063298 A1 | 3/2005 | Ling et al. |
| 2005/0073969 A1 | 4/2005 | Hart et al. |
| 2005/0111397 A1 | 5/2005 | Attar et al. |
| 2005/0111437 A1 | 5/2005 | Maturi |
| 2005/0111599 A1 | 5/2005 | Walton et al. |
| 2005/0135284 A1 | 6/2005 | Nanda et al. |
| 2005/0135291 A1 | 6/2005 | Ketchum et al. |
| 2005/0135318 A1 | 6/2005 | Walton et al. |
| 2005/0135403 A1 | 6/2005 | Ketchum et al. |
| 2005/0135416 A1 | 6/2005 | Ketchum et al. |
| 2005/0141475 A1 | 6/2005 | Vijayan et al. |
| 2005/0163262 A1 | 7/2005 | Gupta |
| 2005/0195763 A1 | 9/2005 | Kadous et al. |
| 2005/0249177 A1* | 11/2005 | Huo et al. ............ 370/342 |
| 2005/0270969 A1 | 12/2005 | Han et al. |
| 2005/0281290 A1 | 12/2005 | Khandekar et al. |
| 2006/0013182 A1* | 1/2006 | Balasubramanian et al. 370/343 |
| 2006/0018397 A1 | 1/2006 | Sampath et al. |
| 2006/0018411 A1 | 1/2006 | Gore et al. |
| 2006/0023772 A1 | 2/2006 | Mudulodu et al. |
| 2006/0078075 A1 | 4/2006 | Stamoulis et al. |
| 2006/0088003 A1 | 4/2006 | Harris |
| 2006/0133273 A1 | 6/2006 | Julian et al. |
| 2006/0133521 A1 | 6/2006 | Sampath et al. |
| 2006/0135080 A1 | 6/2006 | Khandekar et al. |
| 2006/0136790 A1 | 6/2006 | Julian et al. |
| 2006/0171295 A1 | 8/2006 | Ihm et al. |
| 2006/0193338 A1* | 8/2006 | Zheng et al. ............ 370/437 |
| 2006/0198344 A1 | 9/2006 | Teague et al. |
| 2006/0203794 A1 | 9/2006 | Sampath et al. |
| 2006/0203845 A1 | 9/2006 | Monogioudis |
| 2006/0205413 A1 | 9/2006 | Teague |
| 2006/0209732 A1 | 9/2006 | Gorokhov et al. |
| 2006/0209927 A1 | 9/2006 | Khandekar et al. |
| 2006/0217124 A1 | 9/2006 | Bi et al. |
| 2006/0227887 A1 | 10/2006 | Li et al. |
| 2006/0233124 A1 | 10/2006 | Palanki |
| 2006/0233131 A1 | 10/2006 | Gore et al. |
| 2006/0240784 A1 | 10/2006 | Naguib et al. |
| 2006/0274712 A1 | 12/2006 | Malladi et al. |
| 2006/0276212 A1 | 12/2006 | Sampath et al. |
| 2006/0286974 A1 | 12/2006 | Gore et al. |
| 2007/0010957 A1 | 1/2007 | Sampath et al. |
| 2007/0011589 A1 | 1/2007 | Palanki |
| 2007/0019535 A1 | 1/2007 | Sambhwani et al. |
| 2007/0025325 A1 | 2/2007 | Kumar |
| 2007/0025345 A1 | 2/2007 | Bachl et al. |
| 2007/0030839 A1 | 2/2007 | Vimpari et al. |
| 2007/0070942 A1 | 3/2007 | Harris et al. |
| 2007/0071127 A1* | 3/2007 | Gore et al. ............ 375/267 |
| 2007/0087749 A1 | 4/2007 | Ionescu et al. |
| 2007/0195723 A1 | 8/2007 | Attar et al. |
| 2007/0195740 A1 | 8/2007 | Bhushan et al. |
| 2007/0195747 A1 | 8/2007 | Attar et al. |
| 2007/0195899 A1 | 8/2007 | Bhushan et al. |
| 2007/0195908 A1 | 8/2007 | Attar et al. |
| 2007/0293172 A1 | 12/2007 | Shi et al. |
| 2008/0151743 A1* | 6/2008 | Tong et al. ............ 370/204 |
| 2009/0067405 A1 | 3/2009 | Zhang et al. |
| 2009/0310702 A1* | 12/2009 | Lewis ............ 375/267 |
| 2012/0014392 A1 | 1/2012 | Bhushan et al. |
| 2012/0269052 A1* | 10/2012 | Chen et al. ............ 370/209 |

FOREIGN PATENT DOCUMENTS

| | | |
|---|---|---|
| EP | 1367760 A2 | 12/2003 |
| EP | 1422851 A1 | 5/2004 |
| EP | 1489775 A1 | 12/2004 |
| EP | 1513304 A2 | 3/2005 |
| EP | 1542488 A | 6/2005 |
| EP | 1565015 A2 | 8/2005 |
| EP | 1596525 A1 | 11/2005 |
| EP | 1608120 A2 | 12/2005 |
| EP | 1619847 A2 | 1/2006 |
| GB | 2394871 A | 5/2004 |
| JP | 2000270024 | 9/2000 |
| JP | 2002320260 A | 10/2002 |
| JP | 2002374562 A | 12/2002 |
| JP | 2002544733 | 12/2002 |
| JP | 2003533078 | 11/2003 |
| JP | 2004158901 A | 6/2004 |
| JP | 2005510904 A | 4/2005 |
| JP | 2005536967 T | 12/2005 |
| JP | 2006270968 A | 10/2006 |
| JP | 2009503912 A | 1/2009 |
| KR | 20040029416 | 4/2004 |
| KR | 2005120806 | 12/2005 |
| RU | 2238611 C1 | 10/2004 |
| RU | 2004117217 A | 3/2005 |
| WO | WO0069203 | 11/2000 |
| WO | 0176110 A | 10/2001 |
| WO | WO0180477 | 10/2001 |
| WO | WO0219605 | 3/2002 |
| WO | WO03017688 A2 | 2/2003 |
| WO | WO03034644 A1 | 4/2003 |
| WO | WO03041298 | 5/2003 |
| WO | WO03096581 A1 | 11/2003 |
| WO | WO03096598 | 11/2003 |
| WO | WO2004004269 | 1/2004 |
| WO | WO2004038984 A2 | 5/2004 |
| WO | WO2004038988 | 5/2004 |
| WO | WO2004056142 | 7/2004 |
| WO | WO2004057894 A1 | 7/2004 |
| WO | WO2004084450 | 9/2004 |
| WO | WO2004095851 | 11/2004 |
| WO | WO2004098098 | 11/2004 |
| WO | WO2004114548 A1 | 12/2004 |
| WO | WO2004114549 | 12/2004 |
| WO | WO2005015775 | 2/2005 |
| WO | WO2005032001 A1 | 4/2005 |
| WO | WO2005048640 | 5/2005 |
| WO | WO2005067247 A1 | 7/2005 |
| WO | WO2005071867 | 8/2005 |
| WO | 2005088882 A | 9/2005 |
| WO | WO2005125139 A1 | 12/2005 |
| WO | WO2006086497 A1 | 8/2006 |

OTHER PUBLICATIONS

Hermann Rohling et al., : "Performance Comparison of Different Multiple Access Schemes for the Downlink of an OFDM Communication System", Vehicular Technology Conference, 1997, 47th IEEE, vol. 3, May 3-7, 1997, pp. 1365-1369.

International Search Report and Written Opinion—PCT/US2007/

062453, International Search Authority—European Patent Office—Aug. 14, 2007.
Ojanpera, T. et al.: "Frames—Hybrid Multiple Access Technology," IEEE International Symposium on Spread Spectrum Techniques and Applications, No. 1, Sep. 22, 1996, pp. 320-324.
Taiwan Search Report—TW096106485—TIPO—Mar. 8, 2011.
Taiwan Search Report—TW096106486—TIPO—Jan. 10, 2011.
Taiwan Search Report—TW096106487—TIPO—Dec. 15, 2010.
Taiwanese Search report—096106482—TIPO—Jan. 24, 2011.
Taiwan Search Report—TW097142233—TIPO—Dec. 20, 2011.

\* cited by examiner

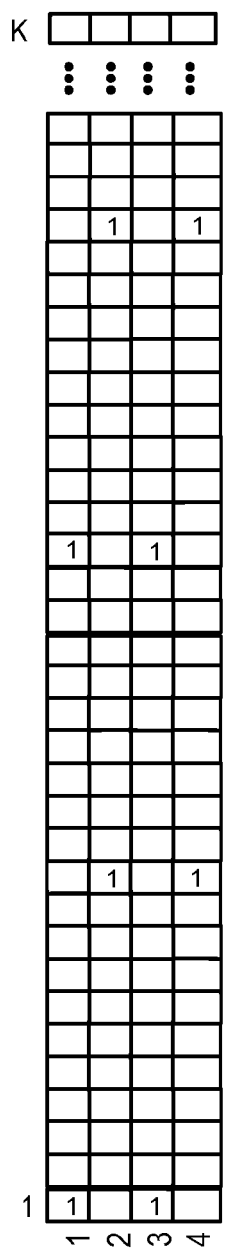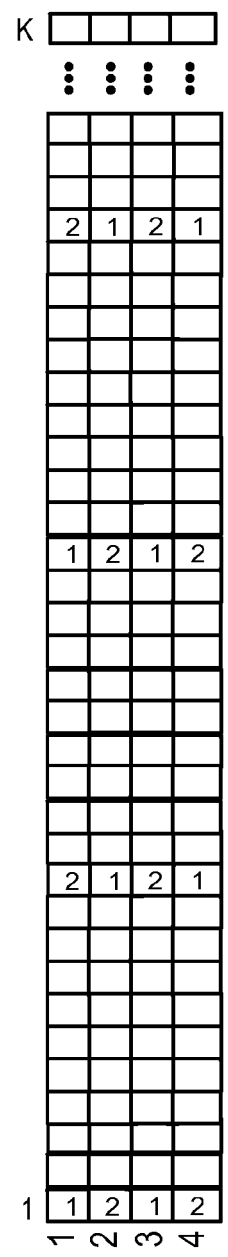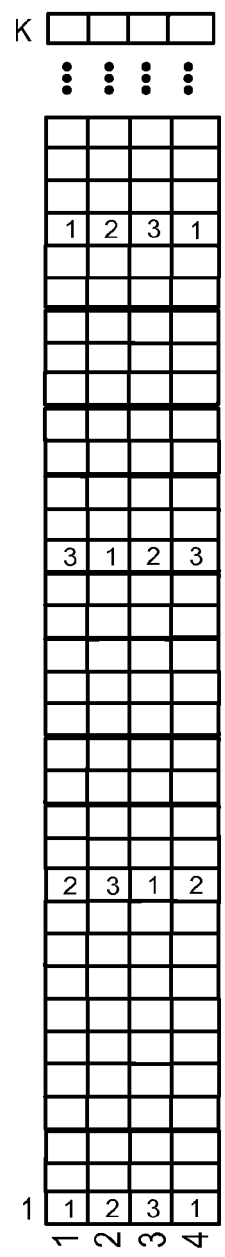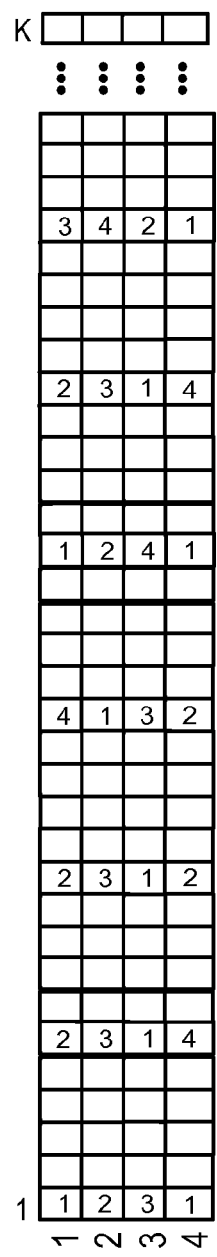
FIG. 7A — SINGLE LAYER TRANSMISSION
FIG. 7B — TWO LAYER TRANSMISSION
FIG. 7C — THREE LAYER TRANSMISSION
FIG. 7D — FOUR LAYER TRANSMISSION

SPATIAL PILOT STRUCTURE FOR MULTI-ANTENNA WIRELESS COMMUNICATION

CLAIM OF PRIORITY UNDER 35 U.S.C. §119

The present Application for Patent claims priority to Provisional Application Ser. No. 60/775,443, entitled "Wireless Communication System and Method," and Provisional Application Ser. No. 60/775,693, entitled "DO Communication System and Method," both filed Feb. 21, 2006, assigned to the assignee hereof, and expressly incorporated herein by reference.

BACKGROUND

I. Field

The present disclosure relates generally to communication, and more specifically to transmission techniques for a wireless communication system.

II. Background

Wireless communication systems are widely deployed to provide various communication services such as voice, video, packet data, messaging, broadcast, etc.

These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A multiple-access system may utilize one or more multiplexing schemes such as code division multiplexing (CDM), time division multiplexing (TDM), etc. The system may be deployed and may serve existing terminals. It may be desirable to improve the performance of the system while retaining backward compatibility for the existing terminals. For example, it may be desirable to employ spatial techniques such as multiple-input multiple-output (MIMO) and spatial division multiple access (SDMA) to improve throughput and/or reliability by exploiting additional spatial dimensionalities provided by use of multiple antennas.

A multi-antenna communication system supports multiple-input multiple-output (MIMO) transmission from multiple (T) transmit antennas to multiple (R) receive antennas. A MIMO channel formed by the T transmit antennas and R receive antennas is composed of S spatial channels, where $S \leq \min\{T, R\}$. The S spatial channels may be used to transmit data in parallel to achieve higher overall throughput and/or redundantly to achieve greater reliability.

An accurate estimate of a wireless channel between a transmitter and a receiver is normally needed at the receiver in order to recover data sent via the wireless channel. Channel estimation is typically performed by sending a pilot from the transmitter and measuring the pilot at the receiver. The pilot is made up of symbols that are known a priori by both the transmitter and receiver. The receiver can thus estimate the channel response based on the received symbols and the known symbols.

The multi-antenna system supports MIMO receivers (which are receivers equipped with multiple antennas). MIMO receivers typically require different channel estimates and thus have different requirements for the pilot, as described below. Since pilot transmission represents overhead in the multi-antenna system, it is desirable to minimize pilot transmission to the extent possible. However, the pilot transmission should be such that MIMO receivers can obtain channel estimates of sufficient quality.

There is therefore a need in the art for transmission techniques to efficiently transmit a pilot in a multi-antenna system that can support spatial techniques while retaining backward compatibility for existing terminals.

SUMMARY

Techniques for transmitting a spatial pilot to support MIMO receivers in a multi-antenna and multi-layer transmission communication system are described herein.

According to one embodiment of the present invention, a method of transmitting a pilot in a wireless communication system is described. The method includes generating a first layer pilot for a single layer transmission. The first layer pilot is repeated across subbands in a first OFDM symbol and the first layer pilot is also repeated offset from the first OFDM symbol in an adjacent second OFDM symbol. The first and second OFDM symbols are then transmitted.

According to another embodiment of the present invention, an apparatus in a wireless communication system is described. The apparatus includes a pilot generator operative to generate at least one pilot based on a number of layers of transmission with each of the at least one pilot being repeated across subbands of a first OFDM symbol. The at least one pilot is further repeated and offset from others of the at least one pilot of the first OFDM symbol across subbands of an adjacent second OFDM symbol. The apparatus further includes a plurality of transmitter units operative to transmit each of the first and second OFDM symbols in a respective number of layer transmission via a plurality of transmit antennas.

According to a further embodiment of the present invention, a method of performing channel estimation in a wireless communication system is described. The method includes obtaining, via a plurality of receive antennas, received symbols each including a first layer pilot with adjacent ones of the received symbols including the first layer pilot offset in the subbands from each other. The method further includes processing the received symbols based on the first layer pilot to obtain estimates of a plurality of channels between the plurality of transmit antennas and the plurality of receive antennas.

According to a yet further embodiment of the present invention, an apparatus in a wireless communication system is described. The apparatus includes a plurality of receiver units operative to provide received symbols each including a first layer pilot with adjacent ones of the received symbols including the first layer pilot offset in the subbands from each other. The apparatus further includes a channel estimator operative to process the received symbols based on the first layer pilot to obtain estimates of a plurality of channels between the plurality of transmit antennas and the plurality of receive antennas.

BRIEF DESCRIPTION OF THE DRAWINGS

FIGS. 7A-7D show a spatial pilot structure for a High Rate Packet Data (HRPD) communication system that supports OFDM.

DETAILED DESCRIPTION

The transmission techniques described herein may be used for various wireless communication systems such as CDMA, TDMA, FDMA, OFDMA, and SC-FDMA systems. The terms "systems" and "networks" are often used interchangeably. A CDMA system may implement a radio technology such cdma2000, Universal Terrestrial Radio Access (UTRA), Evolved UTRA (E-UTRA), etc. cdma2000 covers IS-2000, IS-95 and IS-856 standards. UTRA includes Wideband-CDMA (W-CDMA) and Low Chip Rate (LCR). A TDMA system may implement a radio technology such as Global System for Mobile Communications (GSM). An OFDMA system may implement a radio technology such as Long Term Evolution (LTE), IEEE 802.20, Flash-OFDM®, etc. UTRA, E-UTRA, GSM and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

For clarity, various aspects of the techniques are described below for a High Rate Packet Data (HRPD) system that implements IS-856. HRPD is also referred to as Evolution-Data Optimized (EV-DO), Data Optimized (DO), High Data Rate (HDR), etc. The terms HRPD and EV-DO are used often interchangeably. Currently, HRPD Revisions (Revs.) 0, A, and B have been standardized, HRPD Revs. 0 and A are deployed, and HRPD Rev. C is under development. HRPD Revs. 0 and A cover single-carrier HRPD (1xHRPD). HRPD Rev. B covers multi-carrier HRPD and is backward compatible with HRPD Revs. 0 and A. The techniques described herein may be incorporate in any HRPD revision. For clarity, HRPD terminology is used in much of the description below.

Figure 1:
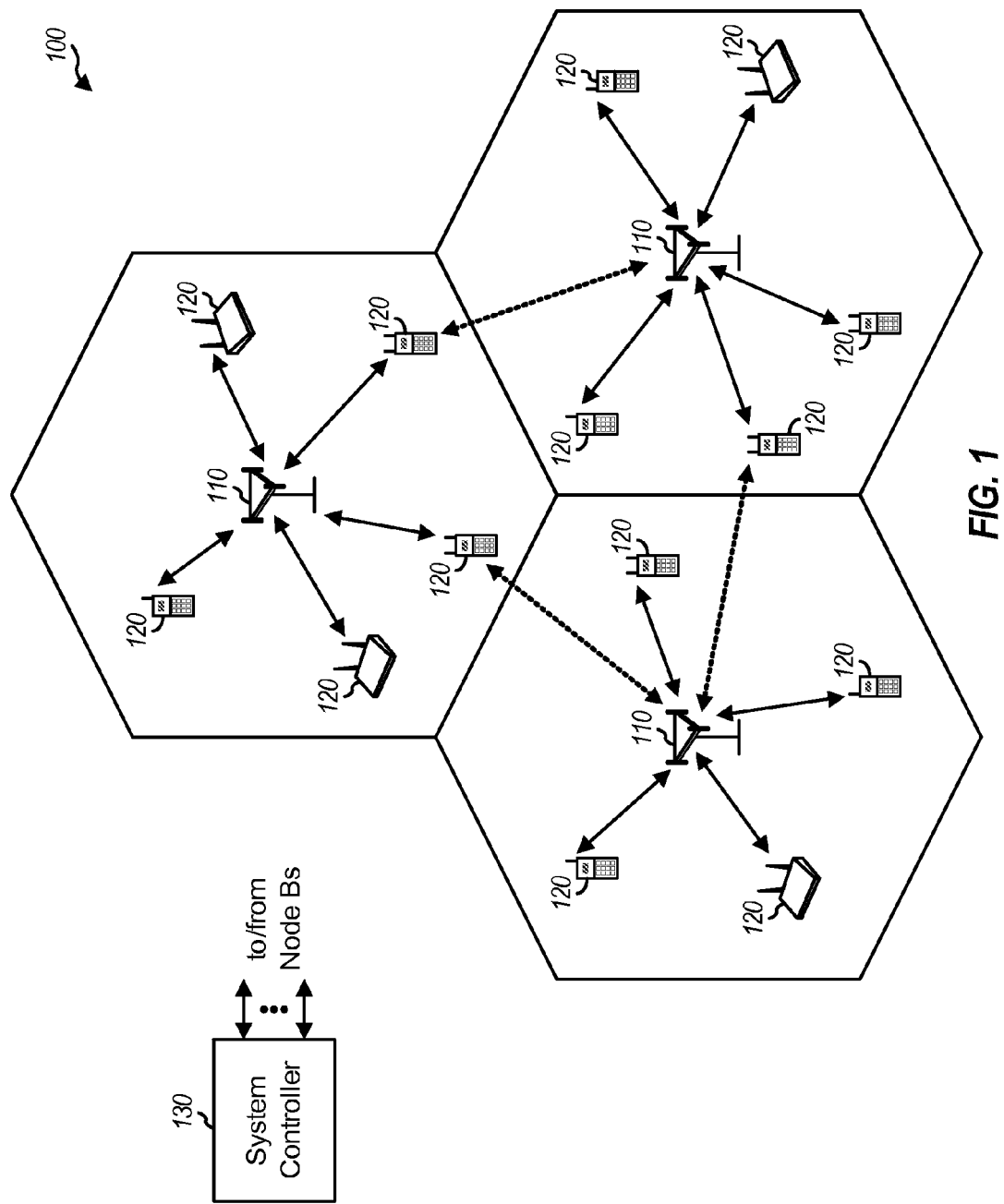
FIG. 1 shows a High Rate Packet Data (HRPD) communication system.

FIG. 1 shows an HRPD communication system 100 with multiple access points 110 and multiple terminals 120. An access point is generally a fixed station that communicates with the terminals and may also be referred to as a base station, a Node B, etc. Each access point 110 provides communication coverage for a particular geographic area and supports communication for the terminals located within the coverage area. Access points 110 may couple to a system controller 130 that provides coordination and control for these access points. System controller 130 may include network entities such as a Base Station Controller (BSC), a Packet Control Function (PCF), a Packet Data Serving Node (PDSN), etc.

Terminals 120 may be dispersed throughout the system, and each terminal may be stationary or mobile. A terminal may also be referred to as an access terminal, a mobile station, a user equipment, a subscriber unit, a station, etc. A terminal may be a cellular phone, a personal digital assistant (PDA), a wireless device, a handheld device, a wireless modem, a laptop computer, etc. A terminal may support any HRPD Revisions. In HRPD, a terminal may receive a transmission on the forward link from one access point at any given moment and may send a transmission on the reverse link to one or more access points. The forward link (or downlink) refers to the communication link from the access points to the terminals, and the reverse link (or uplink) refers to the communication link from the terminals to the access points.

Figure 2:
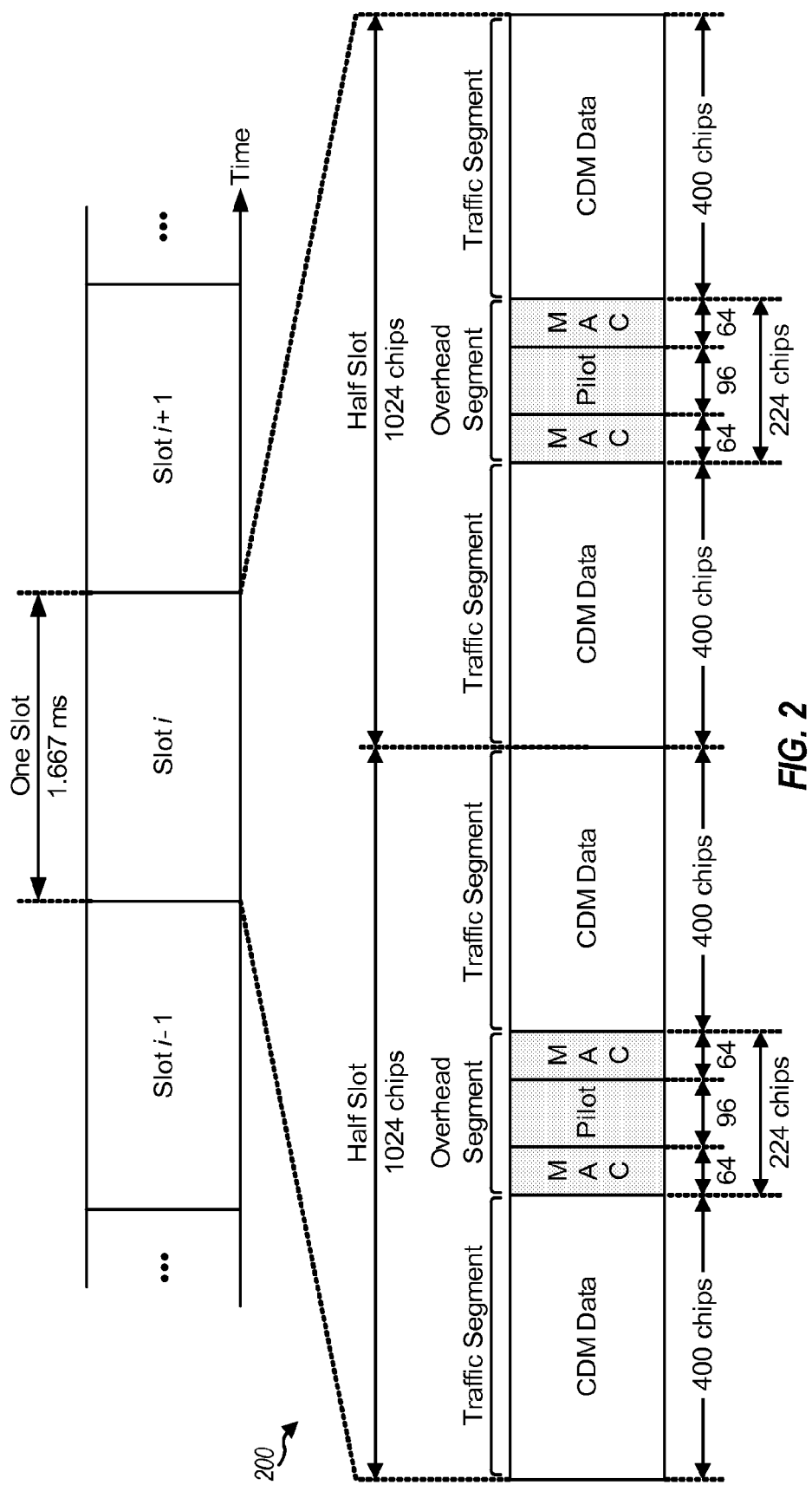
FIG. 2 shows a single-carrier slot structure that supports CDM.

FIG. 2 shows a single-carrier slot structure 200 that supports CDM on the forward link in HRPD. The transmission timeline is partitioned into slots. Each slot has a duration of 1.667 milliseconds (ms) and spans 2048 chips. Each chip has a duration of 813.8 nanoseconds (ns) for a chip rate of 1.2288 mega chips/second (Mcps). Each slot is divided into two identical half-slots. Each half-slot includes (i) an overhead segment composed of a pilot segment at the center of the half-slot and two Media Access Control (MAC) segments on both sides of the pilot segment and (ii) two traffic segments on both sides of the overhead segment. The traffic segments may also be referred to as traffic channel segments, data segments, data fields, etc. The pilot segment carries pilot and has a duration of 96 chips. Each MAC segment carries signaling (e.g., reverse power control (RPC) information) and has a duration of 64 chips. Each traffic segment carries traffic data (e.g., unicast data for specific terminals, broadcast data, etc.) and has a duration of 400 chips.

HRPD Revs. 0, A and B use CDM for data sent in the traffic segments. A traffic segment may carry CDM data for one or more terminals being served by an access point. The traffic data for each terminal may be processed based on coding and modulation parameters determined by channel feedback received from that terminal to generate data symbols. The data symbols for the one or more terminals may be demultiplexed and covered with 16-chip Walsh functions or codes to generate the CDM data for the traffic segment. The CDM data is thus generated in the time domain using Walsh functions. A CDM traffic segment is a traffic segment carrying CDM data.

It may be desirable to use OFDM and/or single-carrier frequency division multiplexing (SC-FDM) for data sent in the traffic segments. OFDM and SC-FDM partition the available bandwidth into multiple orthogonal subcarriers, which are also referred to as tones, bins, etc. Each subcarrier may be modulated with data. In general, modulation symbols are sent in the frequency domain with OFDM and in the time domain with SC-FDM. OFDM and SC-FDM have certain desirable characteristics such as the ability to readily combat intersymbol interference (ISI) caused by frequency selective fading. OFDM can also efficiently support MIMO and SDMA, which may be applied independently on each subcarrier and may thus provide good performance in a frequency selective channel. For clarity, the use of OFDM to send data is described below.

It may be desirable to support OFDM while retaining backward compatibility with HRPD Revs. 0, A and B. In HRPD, the pilot and MAC segments may be demodulated by all active terminals at all times whereas the traffic segments may be demodulated by only the terminals being served. Hence, backward compatibility may be achieved by retaining the pilot and MAC segments and modifying the traffic segments. OFDM data may be sent in an HRPD waveform by replacing the CDM data in a given 400-chip traffic segment with one or more OFDM symbols having a total duration of 400 chips or less.

Figure 3:
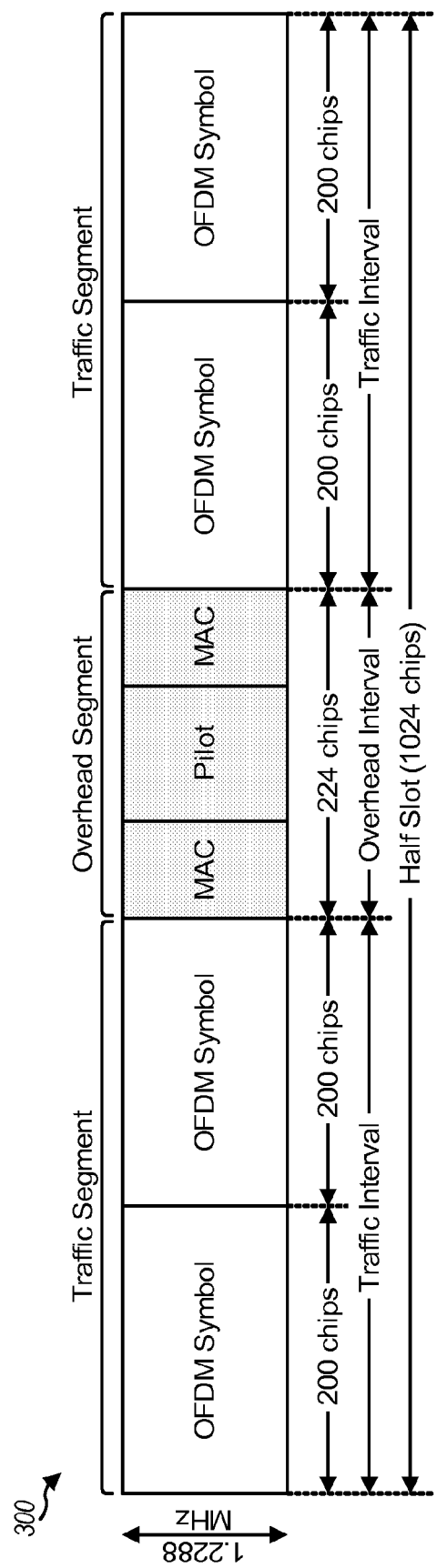
FIG. 3 shows a single-carrier slot structure that supports OFDM.

FIG. 3 shows a single-carrier slot structure 300 that supports OFDM in HRPD. For simplicity, only one half-slot is shown in FIG. 3A. The half-slot includes (i) an overhead segment composed of a 96-chip pilot segment at the center of the half-slot and two 64-chip MAC segments on both sides of the pilot segment and (ii) two traffic segments on both sides of the overhead segment. In general, each traffic segment may carry one or more OFDM symbols. In the example shown in FIG. 3A, each traffic segment carries two OFDM symbols, and each OFDM symbol has a duration of 200 chips and is sent in one OFDM symbol period of 200 chips.

Figure 4:
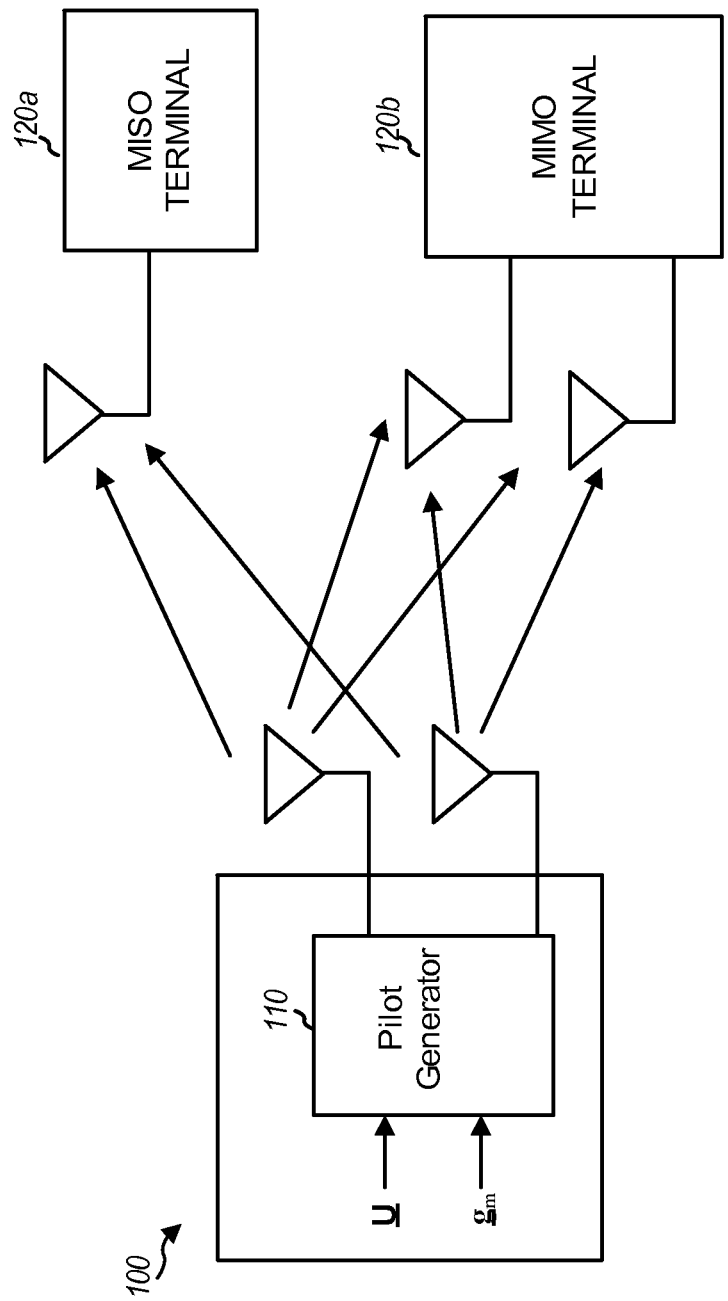
FIG. 4 shows a block diagram of a transmitter and receivers in a High Rate Packet Data (HRPD) communication system.

FIG. 4 shows a detail of an access point 110 of the multi-antenna HRPD communication system 100 with two terminals 120a and 120b. For simplicity, access point 110 has two transmit antennas, MISO terminal 120a has a single receive antenna, and MIMO terminal 120b has two receive antennas.

A MISO channel formed by the two antennas at the access point 110 and the single antenna at the MISO terminal 120a may be characterized by a 1×2 channel response row vector $h_{1 \times 2}$. A MIMO channel formed by the two antennas at the access point 110 and the two antennas at the MIMO terminal 120b may be characterized by a 2×2 channel response matrix $H_{2 \times 2}$. The access point 110 transmits a pilot from the two transmit antennas to allow the MISO and MIMO terminals to estimate their respective MISO and MIMO channels. A pilot generator 112 at the access point 110 may generate a composite pilot.

The access point 110 may transmit data in parallel from both transmit antennas to the MIMO receiver to improve throughput. The description above is for a 2×2 system in which the access point has two transmit antennas and the terminals have at most two receive antennas. In general, a multi-antenna system may include transmitters and receivers with any number of antennas, so that T and R may be any integer values.

Figure 5:
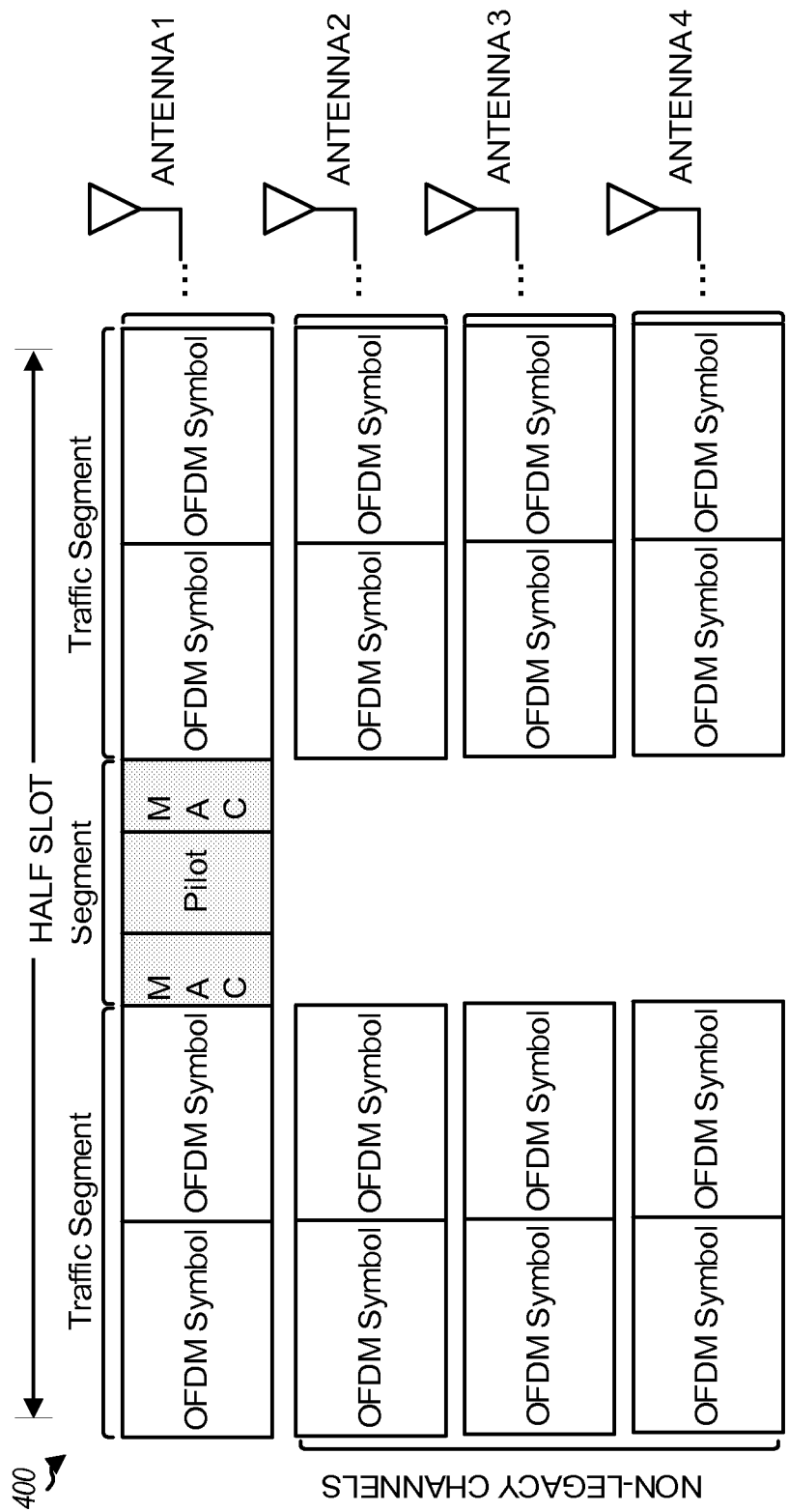
FIG. 5 shows a multi-carrier slot structure that supports OFDM over a legacy and non-legacy channel.

FIG. 5 shows a multi-carrier slot structure 400 that supports OFDM in HRPD. In HRPD Rev. B, multiple 1×HRPD waveforms may be multiplexed in the frequency domain to obtain a multi-carrier HRPD waveform that fills a given spectral allocation and is transmitted on a first transmit antenna. In the example show in FIG. 5, one 1×HRPD waveform is illustrated as being configured as a legacy channel including the pilot and MAC segments which may be demodulated by all active terminals at all times whereas the traffic segments may be demodulated by only the terminals being served. Hence, backward compatibility may be achieved by retaining the pilot and MAC segments. Also shown in FIG. 5 are three 1×HRPD waveforms configured as non-legacy channels, transmitted on respective second, third and fourth transmit antennas, which do not require the overhead segments since the OFDM symbols include periodic composite pilots embedded in the subbands or tones. As stated, the pilot generator 112 of FIG. 4 generates composite pilots for transmission in the OFDM symbols. A receiving MIMO terminal 120b (FIG. 4) receives the known composite pilot in the OFDM symbols and is able to derive an estimate of the MIMO channel response.

Multi-antenna system may utilize multiple carriers for data and pilot transmission. Multiple carriers may be provided by OFDM, some other multi-carrier modulation techniques, or some other construct. OFDM effectively partitions the overall system bandwidth (W MHz) into multiple (K) orthogonal frequency subbands. These subbands are also called tones, subcarriers, bins, and frequency channels. With OFDM, each subband is associated with a respective subcarrier that may be modulated with data. A multi-antenna OFDM system may use only a subset of the K total subbands for data and pilot transmission, and the remaining subbands may serve as guard subbands to allow the system to meet spectral mask requirements. For simplicity, the following description assumes that all K subbands are usable for data and/or pilot transmission.

Figure 6:
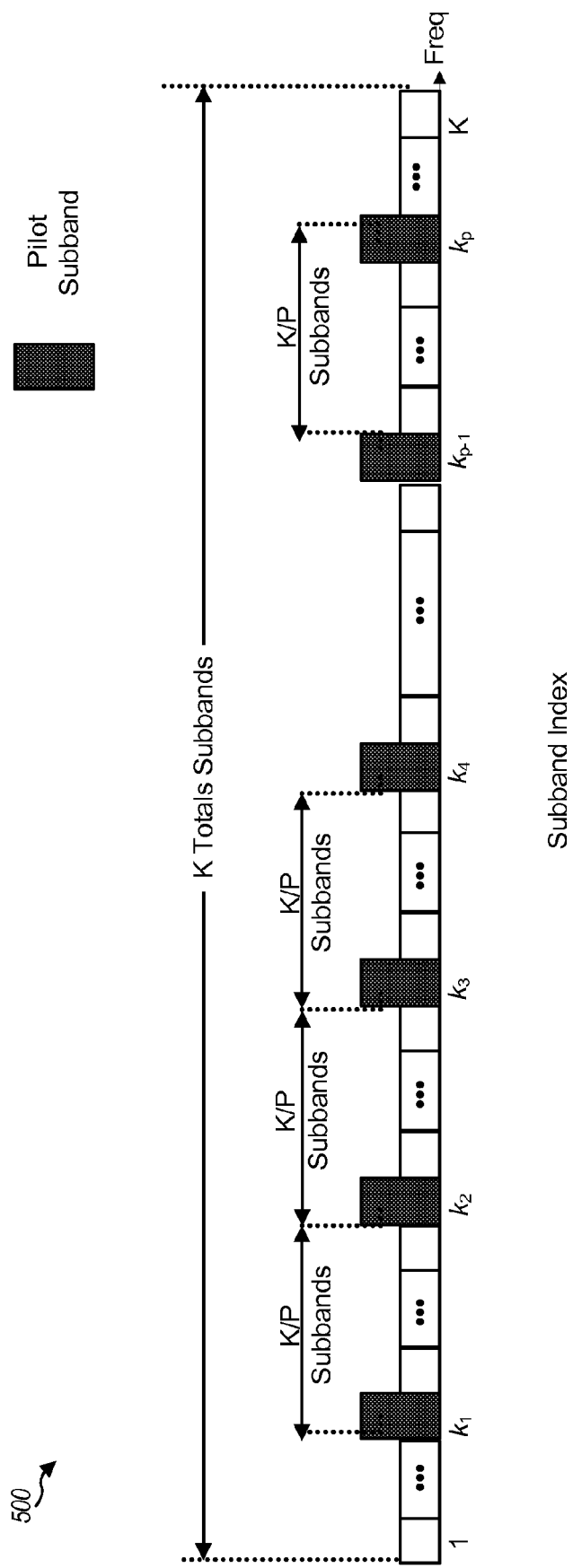
FIG. 6 shows a subband structure for a High Rate Packet Data (HRPD) communication system supporting OFDM.

FIG. 6 shows a subband structure 500 that may be used for pilot transmission in the multi-antenna OFDM system. A transmit symbol is sent on each of P pilot subbands, which are subbands used for pilot transmission, where typically K>P. For improved performance and simplified receiver processing, the P pilot subbands may be uniformly distributed across the K total subbands such that consecutive pilot subbands are spaced apart by K/P subbands. The remaining K−P subbands may be used for data transmission and are called data subbands.

FIGS. 7A-7D show an exemplary pilot transmission scheme for a multi-antenna OFDM system. The present embodiment utilizes spatial pilot tones that are differently formed according to the number of layers or beams that are formed by the multi-antenna OFDM system. Specifically, since a layer may be formed by a beam resulting from a combination of antennas, accurate characterization of the channel cannot solely rely upon the pilot of an antenna but must rely upon a pilot formed for a specific layer or beam. According to the spatial pilot transmission scheme of FIGS. 7A-7D, the per-layer pilot power budget increases as the number of spatial layers decreases.

FIG. 7A illustrates a single layer transmission across a half-slot of OFDM symbols 1-4. As illustrated for each OFDM symbol, such as OFDM symbol 1, the single layer spatial pilot tone repeats and occupies one tone for every 19 data tones. For a 180 tone OFDM symbol, there would be 9 single layer spatial pilot tones. Specifically, for OFDM symbol 1 and OFDM symbol 3, the single layer spatial pilot tone is illustrated as beginning at tone one and repeating every 20 tones and for OFDM symbol 2 and OFDM symbol 4, the single layer spatial pilot tone is illustrated as beginning halfway offset from the adjacent symbols at tone eleven and repeating every 20 tones. Accordingly, the bandwidth overhead for supporting the single layer spatial pilot tone is one in twenty or 5 percent per OFDM symbol for a single layer transmission. In an adjacent OFDM symbol, such as OFDM symbol 2, the single layer spatial pilot tones are offset from the adjacent symbol's single layer spatial pilot tones. It is also noted that one OFDM symbol can leverage the offset position of an adjacent OFDM symbol's single layer spatial pilot tone for additional channel characterization without relying upon additional dedicated spatial pilot tones.

FIG. 7B illustrates a two or double layer transmission across a half-slot of OFDM symbols 1-4. As illustrated for each OFDM symbol, such as OFDM symbol 1, the first layer spatial pilot tone repeats and occupies one tone for every 19 data tones and a second layer spatial tone is offset from the first and also repeats and occupies one tone for every 19 data tones. For a 180 tone OFDM symbol, there would be 18 first layer and second layer spatial pilot tones. Specifically, for OFDM symbol 1 and OFDM symbol 3, the first layer and second layer spatial pilot tones are illustrated as beginning at tone one and repeating every 10 tones and for OFDM symbol 2 and OFDM symbol 4, the first layer and second layer spatial pilot tones are illustrated as beginning halfway offset from the adjacent symbols at tone eleven and repeating every 10 tones. Accordingly, the bandwidth overhead for supporting the first layer and second layer spatial pilot tones is one in 10 or 10 percent per OFDM symbol for a two layer transmission.

FIG. 7C illustrates a three layer transmission across a half-slot of OFDM symbols 1-4. As illustrated for each OFDM symbol, the first layer spatial pilot tone repeats and occupies one tone for every 29 data tones, a second layer spatial pilot tone repeats and occupies one tone for every 29 data tones, and a third layer spatial pilot tone repeats and occupies one tone for every 29 data tones. The first layer, second layer, and third layer spatial pilot tones are staggered along the OFDM symbols 1-4 and repeat such that the first layer, second layer, and third layer spatial pilot tones repeat every 10 tones and occupies one tone for every 9 data tones. For a 180 tone OFDM symbol, there would be 18 first layer, second layer, and third layer spatial pilot tones. Accordingly, the bandwidth overhead for supporting the first layer, second layer, and third layer spatial pilot tones is one in 10 or 10 percent per OFDM symbol for a three layer transmission.

FIG. 7D illustrates a four layer transmission across a half-slot of OFDM symbols 1-4. As illustrated for each OFDM symbol, the first layer spatial pilot tone repeats and occupies one tone for every 19 data tones, a second layer spatial pilot tone repeats and occupies one tone for every 19 data tones, a third layer spatial pilot tone repeats and occupies one tone for every 19 data tones, and a fourth layer spatial pilot tone repeats and occupies one tone for every 19 data tones. The first layer, second layer, third layer, and fourth layer spatial pilot tones are staggered along the OFDM symbols 1-4 and repeat such that the first layer, second layer, third layer, and fourth spatial pilot tones repeat every 5 tones and occupies one tone for every 4 data tones. For a 180 tone OFDM symbol, there would be 36 first layer, second layer, third layer, and fourth layer spatial pilot tones. Accordingly, the bandwidth overhead for supporting the first layer, second layer, third layer, and fourth layer spatial pilot tones is one in 5 or 20 percent per OFDM symbol for a four layer transmission.

Since the various layer spatial pilot tones are transmitted on different sets of P pilot subbands in different symbol periods, this staggered pilot scheme allows the MIMO receivers to obtain pilot observations for more than their specific subbands without increasing the number of subbands used for pilot transmission in any one symbol period. For all pilot transmission schemes, the MIMO receivers may derive frequency response estimates for the channel based on their received symbols and using various channel estimation techniques.

Figure 8:
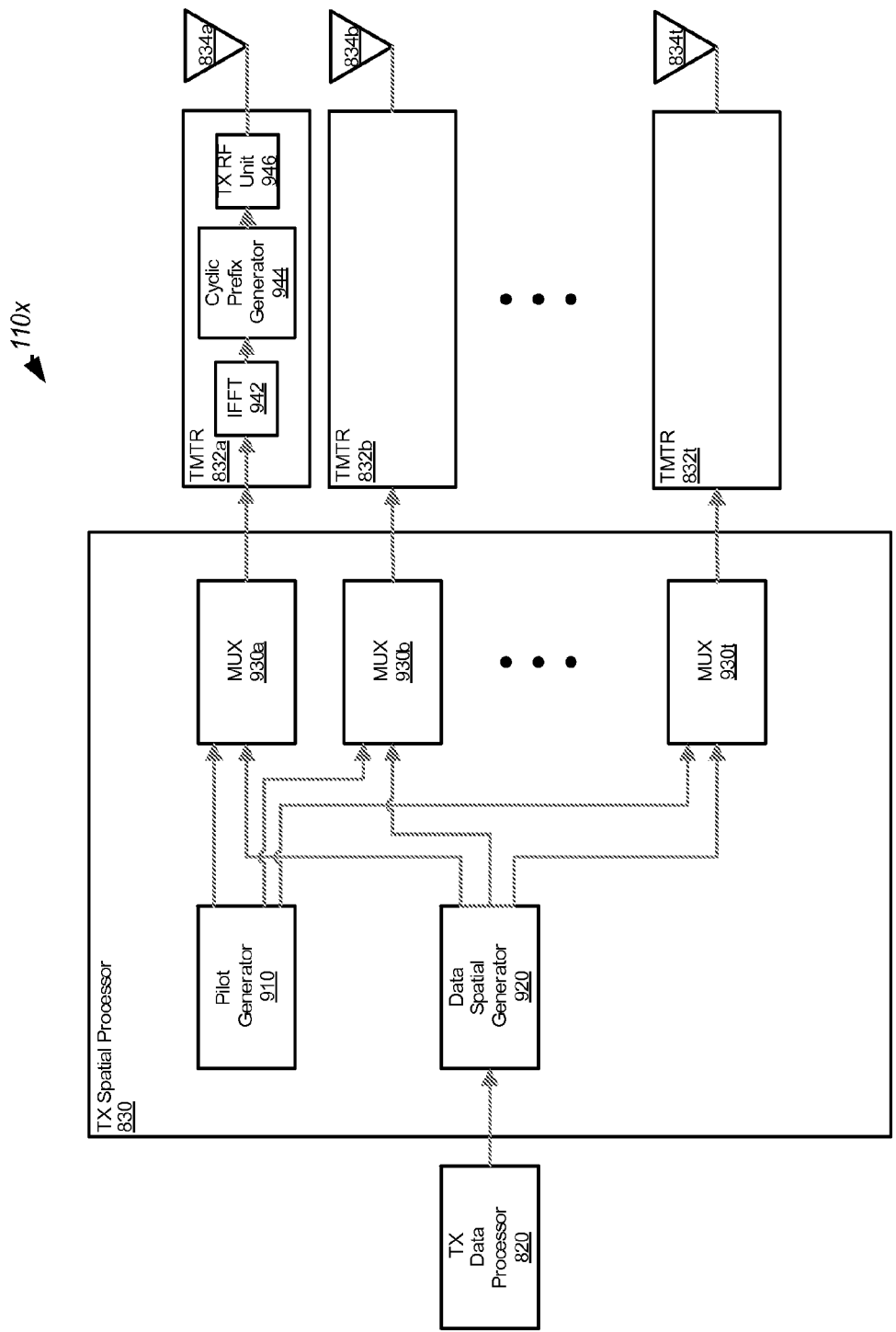
FIG. 8 shows a block diagram of a transmitter in a High Rate Packet Data (HRPD) communication system that supports OFDM.

FIG. 8 shows a block diagram of an embodiment of TX spatial processor 830 and transmitter units 832 at access point 110. TX spatial processor 830 includes a pilot generator 910, a data spatial processor 920, and T multiplexers (Mux) 930a through 930t for the T transmit antennas.

Pilot generator 910 generates the T composite pilots for the MIMO terminals. The composite spatial pilot tones for the subbands are generated according to the spatial layer transmissions described hereinabove.

Data spatial processor 920 receives the data symbols from TX data processor 820 and performs spatial processing on these data symbols. For example, data spatial processor 920 may demultiplex the data symbols into T substreams for the T transmit antennas. Data spatial processor 920 may or may not perform additional spatial processing on these substreams, depending on the system design. Each multiplexer 930 receives a respective data symbol substream from data spatial processor 920 and the transmit symbols for its associated transmit antenna, multiplexes the data symbols with the transmit symbols, and provides an output symbol stream.

Each transmitter unit 832 receives and processes a respective output symbol stream. Within each transmitter unit 832, an IFFT unit 942 transforms each set of K output symbols for the K total subbands to the time domain using a K-point IFFT and provides a transformed symbol that contains K time-domain chips. A cyclic prefix generator 944 repeats a portion of each transformed symbol to form an OFDM symbol that contains K+C chips, where C is the number of chips repeated. The repeated portion is called a cyclic prefix and is used to combat delay spread in the wireless channel. A TX radio frequency (RF) unit 946 converts the OFDM symbol stream into one or more analog signals and further amplifies, filters, and frequency upconverts the analog signal(s) to generate a modulated signal that is transmitted from an associated antenna 834. Cyclic prefix generator 944 and/or TX RF unit 946 may also provide the cyclic delay for its transmit antenna.

Figure 9:
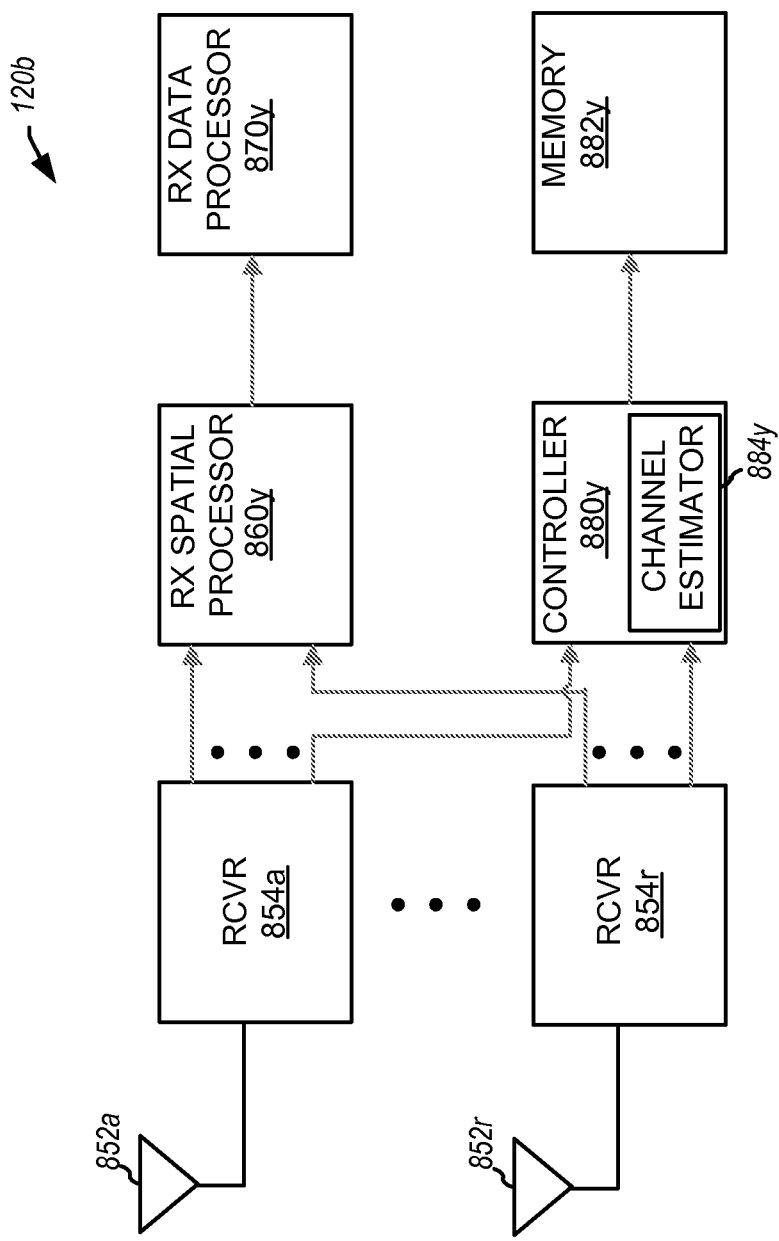
FIG. 9 shows a block diagram of a receiver in a High Rate Packet Data (HRPD) communication system that supports OFDM.

FIG. 9 shows a block diagram of a MIMO terminal 120b in a multi-antenna OFDM system. At MIMO terminal 120b, R antennas 852a through 852r receive the T modulated signals, and each antenna 852 provides a received signal to a respective receiver unit 854. Each receiver unit 854 performs processing complementary to that performed by transmitter units and provides (1) received data symbols to an RX spatial processor 860y and (2) received pilot symbols to a channel estimator 884y within a controller 880y. Channel estimator 884y performs channel estimation for the MIMO receiver and provides a MIMO channel response estimate. RX spatial processor 860y performs spatial processing on R received data symbol streams from R receiver units 854a through 854r with the MIMO channel response estimate and provides detected symbols. An RX data processor 870y symbol demaps, deinterleaves, and decodes the detected symbols and provides decoded data. Controller 880y control the operation of various processing units at MIMO terminal 120b and memory unit 882y stores data and/or program codes used by controller 880y.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A method of transmitting a pilot in a wireless communication system, comprising:
    generating a first layer pilot for a single layer transmission;
    repeating the first layer pilot across non-adjacent subbands of a first orthogonal frequency division multiplex (OFDM) symbol;
    repeating, offset from the first layer pilot of the first OFDM symbol, the first layer pilot across non-adjacent subbands of an adjacent second OFDM symbol; and
    transmitting the first and second OFDM symbols in the single layer transmission, wherein the first and second OFDM symbols are placed in a slot that supports backward compatibility by retaining pilot and media access control (MAC) segments within the slot and modifying traffic segments within the slot in at least one legacy channel while pilot and MAC segments are not retained in at least one non-legacy channel.

2. The method of claim 1, further comprising:
    generating a second layer pilot for a two layer transmission;
    repeating offset from the first layer pilot the second layer pilot across subbands of a first OFDM symbol;
    repeating offset from the second layer pilot of the first OFDM symbol the second layer pilot across subbands of an adjacent second OFDM symbol; and
    transmitting the first and second OFDM symbols in the two layer transmission.

3. The method of claim 2, further comprising:
    generating a third layer pilot for a three layer transmission;
    repeating offset from the first and second layer pilots the third layer pilot across subbands of a first OFDM symbol;
    repeating offset from the third layer pilot of the first OFDM symbol the third layer pilot across subbands of an adjacent second OFDM symbol; and
    transmitting the first and second OFDM symbols in the three layer transmission.

4. The method of claim 3, further comprising:
    generating a fourth layer pilot for a four layer transmission;
    repeating offset from the first, second and third layer pilots the fourth layer pilot across subbands of a first OFDM symbol;
    repeating offset from the fourth layer pilot of the first OFDM symbol the fourth layer pilot across subbands of an adjacent second OFDM symbol; and
    transmitting the first and second OFDM symbols in the four layer transmission.

5. The method of claim 2, wherein the first and second layer pilots are alternatingly positioned in the same subbands across the first and second OFDM symbols.

6. The method of claim 3, wherein the first, second and third layer pilots are alternatingly positioned in the same subbands across the first, second and a third OFDM symbols adjacent to at least one of the first and second OFDM symbols.

7. The method of claim 6, wherein the first, second, third and fourth layer pilots are alternatingly positioned in the same subbands across the first, second, third and a fourth OFDM symbols adjacent to at least one of the first, second and third OFDM symbols.

8. The method of claim 1, wherein the first layer pilot occupies approximately 5 percent of the subbands of each of the first and second OFDM symbols.

9. The method of claim 2, wherein the first and second layer pilots occupy approximately 10 percent of the subbands of each of the first and second OFDM symbols.

10. The method of claim 3, wherein the first, second and third layer pilots occupy approximately 10 percent of the subbands of each of the first and second OFDM symbols.

11. The method of claim 4, wherein the first, second, third and fourth layer pilots occupy approximately 20 percent of the subbands of each of the first and second OFDM symbols.

12. An apparatus in a wireless communication system, comprising:
    a pilot generator operative to generate at least one pilot based on a number of layers of transmission, each of the at least one pilot being repeated across non-adjacent subbands of a first orthogonal frequency division multiplex (OFDM) symbol and further being repeated, offset from others of the at least one pilot of the first OFDM symbol, across non-adjacent subbands of an adjacent second OFDM symbol; and
    a plurality of transmitter units operative to transmit each of the first and second OFDM symbols in a respective number of layer transmission via a plurality of transmit antennas, wherein the first and second OFDM symbols are placed in a slot that supports backward compatibility by retaining pilot and media access control (MAC) segments within the slot and modifying traffic segments within the slot in at least one legacy channel while pilot and MAC segments are not retained in at least one non-legacy channel.

13. The apparatus of claim 12, wherein the at least one pilot includes a first layer pilot for a single layer transmission and wherein the first layer pilot is offset across subbands of the first and second OFDM symbols.

14. The apparatus of claim 12, wherein the at least one pilot includes a first layer pilot and a second layer pilot for a two layer transmission and wherein the first and second layer pilots are offset across subbands of the first and second OFDM symbols.

15. The apparatus of claim 12, wherein the at least one pilot includes a first layer pilot, a second layer pilot and a third layer pilot for a three layer transmission and wherein the first, second and third layer pilots are offset across subbands of the first and second OFDM symbols.

16. The apparatus of claim 12, wherein the at least one pilot includes a first layer pilot, a second layer pilot, a third layer pilot and a fourth layer pilot for a four layer transmission and wherein the first, second, third and fourth layer pilots are offset across subbands of the first and second OFDM symbols.

17. The apparatus of claim 14, wherein the first and second layer pilots are alternatingly positioned in the same subbands across the first and second OFDM symbols.

18. The apparatus of claim 15, wherein the first, second and third layer pilots are alternatingly positioned in the same subbands across the first, second and a third OFDM symbols adjacent to at least one of the first and second OFDM symbols.

19. The apparatus of claim 16, wherein the first, second, third and fourth layer pilots are alternatingly positioned in the same subbands across the first, second, third and a fourth OFDM symbols adjacent to at least one of the first, second and third OFDM symbols.

20. The apparatus of claim 13, wherein the first layer pilot occupies approximately 5 percent of the subbands of each of the first and second OFDM symbols.

21. The apparatus of claim 14, wherein the first and second layer pilots occupy approximately 10 percent of the subbands of each of the first and second OFDM symbols.

22. The apparatus of claim 15, wherein the first, second and third layer pilots occupy approximately 10 percent of the subbands of each of the first and second OFDM symbols.

23. The apparatus of claim 16, wherein the first, second, third and fourth layer pilots occupy approximately 20 percent of the subbands of each of the first and second OFDM symbols.

24. An apparatus in a wireless communication system, comprising:
means for generating a first layer pilot for a single layer transmission;
means for repeating the first layer pilot across non-adjacent subbands of a first orthogonal frequency division multiplex (OFDM) symbol;
means for repeating, offset from the first layer pilot of the first OFDM symbol, the first layer pilot across non-adjacent subbands of an adjacent second OFDM symbol; and
means for transmitting the first and second OFDM symbols in the single layer transmission, wherein the first and second OFDM symbols are placed in a slot that supports backward compatibility by retaining pilot and media access control (MAO segments within the slot and modifying traffic segments within the slot in at least one legacy channel while pilot and MAC segments are not retained in at least one non-legacy channel.

25. The apparatus of claim 24, further comprising:
means for generating a second layer pilot for a two layer transmission;
means for repeating offset from the first layer pilot the second layer pilot across subbands of a first OFDM symbol;
means for repeating offset from the second layer pilot of the first OFDM symbol the second layer pilot across subbands of an adjacent second OFDM symbol; and
means for transmitting the first and second OFDM symbols in the two layer transmission.

26. The apparatus of claim 25, further comprising:
means for generating a third layer pilot for a three layer transmission;
means for repeating offset from the first and second layer pilots the third layer pilot across subbands of a first OFDM symbol;
means for repeating offset from the third layer pilot of the first OFDM symbol the third layer pilot across subbands of an adjacent second OFDM symbol; and
means for transmitting the first and second OFDM symbols in the three layer transmission.

27. The apparatus of claim 26, further comprising:
means for generating a fourth layer pilot for a four layer transmission;
means for repeating offset from the first, second and third layer pilots the fourth layer pilot across subbands of a first OFDM symbol;
means for repeating offset from the fourth layer pilot of the first OFDM symbol the fourth layer pilot across subbands of an adjacent second OFDM symbol; and
means for transmitting the first and second OFDM symbols in the four layer transmission.

28. A method of performing channel estimation in a wireless communication system, comprising:
obtaining, via a plurality of receive antennas, received symbols each including a first layer pilot with adjacent ones of the received symbols including the first layer pilot repeated in non-adjacent subbands, wherein the first layer pilot is offset in the adjacent ones of the received symbols; and
processing the received symbols based on the first layer pilot to obtain estimates of a plurality of channels between the plurality of transmit antennas and the plurality of receive antennas, wherein the received symbols are placed in a slot that supports backward compatibility by retaining pilot and media access control (MAC) segments within the slot and modifying traffic segments within the slot in at least one legacy channel while pilot and MAC segments are not retained in at least one non-legacy channel.

29. The method of claim 28, further comprising:
obtaining, via a plurality of receive antennas, received symbols each further including a second layer pilot with adjacent ones of the received symbols including the second layer pilot offset in the subbands from each other; and
processing the received symbols based on the first and second layer pilots to obtain estimates of a plurality of channels between the plurality of transmit antennas and the plurality of receive antennas.

30. The method of claim 29, further comprising:
obtaining, via a plurality of receive antennas, received symbols each further including a third layer pilot with adjacent ones of the received symbols including the third layer pilot offset in the subbands from each other; and
processing the received symbols based on the first, second and third layer pilots to obtain estimates of a plurality of channels between the plurality of transmit antennas and the plurality of receive antennas.

31. The method of claim 30, further comprising:
obtaining, via a plurality of receive antennas, received symbols each further including a fourth layer pilot with adjacent ones of the received symbols including the fourth layer pilot offset in the subbands from each other; and
processing the received symbols based on the first, second, third and fourth layer pilots to obtain estimates of a plurality of channels between the plurality of transmit antennas and the plurality of receive antennas.

32. An apparatus in a wireless communication system, comprising:
a plurality of receiver units operative to provide received symbols each including a first layer pilot with adjacent ones of the received symbols including the first layer pilot repeated in non-adjacent subbands, wherein the first layer pilot is offset in the adjacent ones of the received symbols; and a channel estimator operative to process the received symbols based on the first layer pilot to obtain estimates of a plurality of channels between the plurality of transmit antennas and the plurality of receive antennas, wherein the received symbols are placed in a slot that supports backward compatibility by retaining pilot and media access control (MAC) segments within the slot and modifying traffic segments within the slot in at least one legacy channel while pilot and MAC segments are not retained in at least one non-legacy channel.

33. The apparatus of claim 32, wherein the received symbols each further including a second layer pilot with adjacent ones of the received symbols including the second layer pilot offset in the subbands from each other and wherein the first and second layer pilots are processed to obtain estimates of a plurality of channels between the plurality of transmit antennas and the plurality of receive antennas.

34. The apparatus of claim 33, wherein the received symbols each further including a third layer pilot with adjacent ones of the received symbols including the third layer pilot offset in the subbands from each other and wherein the first, second and third layer pilots are processed to obtain estimates of a plurality of channels between the plurality of transmit antennas and the plurality of receive antennas.

35. The apparatus of claim 34, wherein the received symbols each further including a fourth layer pilot with adjacent ones of the received symbols including the fourth layer pilot offset in the subbands from each other and wherein the first, second, third and fourth layer pilots are processed to obtain estimates of a plurality of channels between the plurality of transmit antennas and the plurality of receive antennas.

36. A computer-program product for transmitting a pilot in a wireless communication system, the computer-program product comprising a non-transitory computer-readable medium having instructions thereon, the computer-readable medium comprising:

code that is executable by a processor for generating a first layer pilot for a single layer transmission;

code that is executable by the processor for repeating the first layer pilot across non-adjacent subbands of a first orthogonal frequency division multiplex (OFDM) symbol;

code that is executable by the processor for repeating, offset from the first layer pilot of the first OFDM symbol, the first layer pilot across non-adjacent subbands of an adjacent second OFDM symbol; and code that is executable by the processor for transmitting the first and second OFDM symbols in the single layer transmission, wherein the first and second OFDM symbols are placed in a slot that supports backward compatibility by retaining pilot and media access control (MAC) segments within the slot and modifying traffic segments within the slot in at least one legacy channel while pilot and MAC segments are not retained in at least one non-legacy channel.

\* \* \* \* \*